Nov. 14, 1961 S. P. CALDWELL 3,008,723
TOOL-HOLDING HANDLE
Filed Nov. 6, 1959
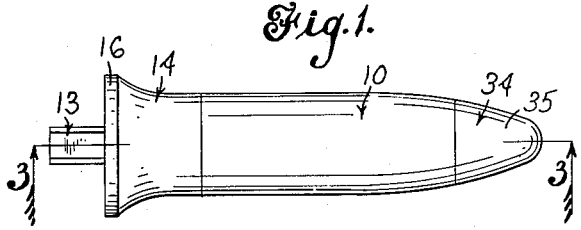
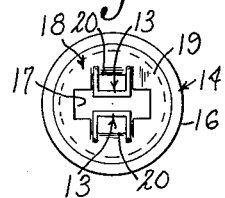
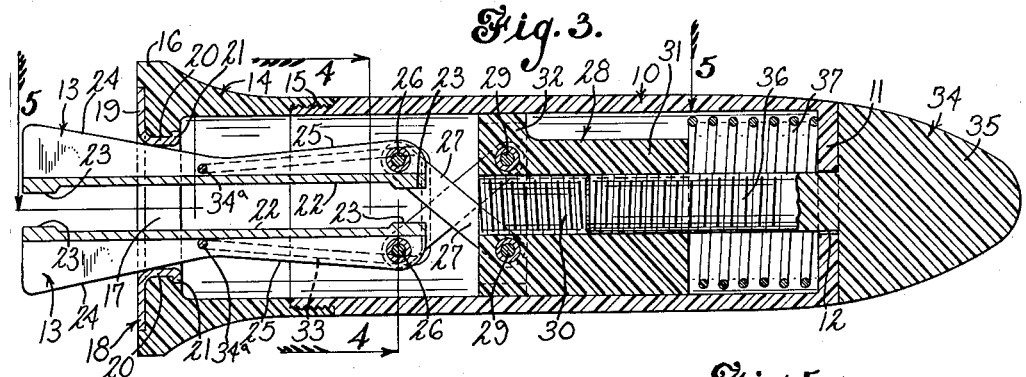
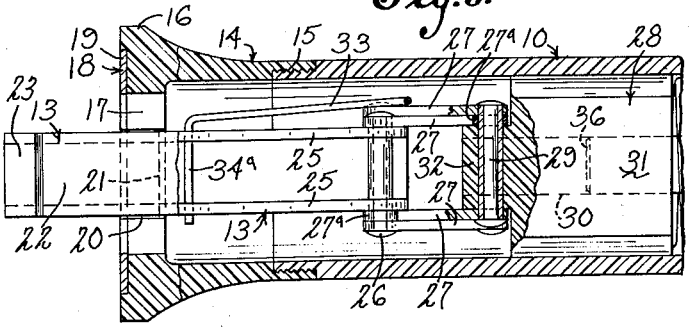
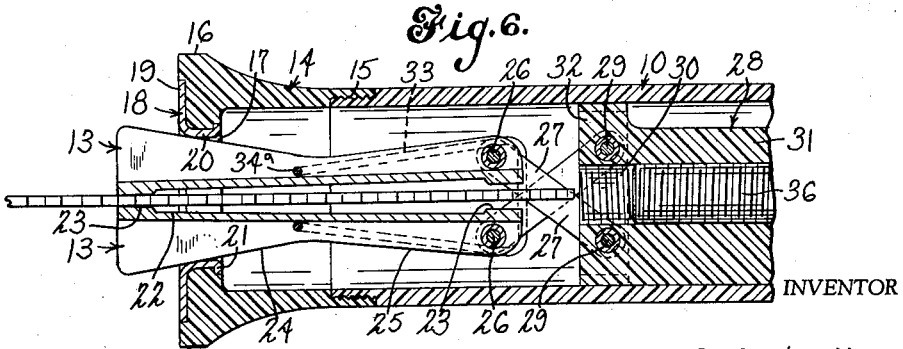
INVENTOR
Samuel P. Caldwell
BY
Rockwell & Bartholow
ATTORNEY.

United States Patent Office 3,008,723
Patented Nov. 14, 1961

3,008,723
TOOL-HOLDING HANDLE
Samuel P. Caldwell, Hamden, Conn., assignor to The Greist Manufacturing Company, New Haven, Conn., a corporation of Connecticut
Filed Nov. 6, 1959, Ser. No. 851,368
5 Claims. (Cl. 279—53)

This invention relates to a tool holder, and relates more particularly to a holder which may provide a supporting handle for a screw driver bit, a chisel blade, a saw blade, or a file, for example, the holder being of the type having a quick-releasable connection to the tool and being of the type to supportingly receive the shank or the tang of the tool. The invention constitutes an improvement of the tool holder illustrated and described in the United States Patent No. 2,479,661 issued August 23, 1949.

One object of the invention is to provide an improved tool holder of the character described above and having two longitudinally extending jaw members cooperating with each other, each jaw member having inner and outer tool engaging or gripping portions.

A further object is to provide in a tool holder such as characterized above, improved means to cam the outer tool gripping portions of the jaws toward one another.

Still another object of the invention is to provide in such a tool holder positive means of connection between the jaws and an operating member for drawing toward one another the inner gripping portions of the jaws.

To these and other ends the invention consists in the novel features and combinations of parts to be hereinafter described and claimed.

In the accompanying drawing:

FIG. 1 is a side elevational view of a tool holder embodying the invention;

FIG. 2 is a view of the left end of the holder as viewed in FIG. 1;

FIG. 3 is an enlarged sectional view taken on line 3—3 of FIG. 1;

FIG. 4 is a sectional view taken on line 4—4 of FIG. 3;

FIG. 5 is a sectional view taken on line 5—5 of FIG. 3; and

FIG. 6 is a sectional view similar to FIG. 3, but illustrating the parts of the holder in an operative position, the holder being shown in association with a hack saw blade.

In the drawing the tubular body of the holder, which may be formed of opaque plastic or other suitable material, is indicated at 10, and as shown in FIG. 1, has a somewhat tapered rear-end portion. The rear end of the body 10 may have an integrally formed cap 11 provided with a central aperture 12. The jaws of the tool holder, which extend into the front end of the body 10, are indicated generally at 13. The jaws 13 also extend through a generally tubular front cap 14 which may be formed of the same material as the body. The rear end of the cap 14 is threaded on the body as at 15. The front of the cap 14 is provided with a radial flange 16, and the forward extremity of the cap is provided with a cruciform opening 17 through which the jaws 13 extend.

The front cap of the holder is reinforced by a steel flange 18 through which the jaws extend and having a plate part 19 abutting the forward face of the cap. The flange 18 is provided with a cruciform opening corresponding to the opening 17 and formed in part by two oppositely spaced inwardly extending lugs 20 which line opposing portions of the cruciform opening 17, as indicated in FIG. 3. These lugs have their inner extremities bent over, as at 21, to secure the flange 18 to the cap. The lugs 20 cooperate with the respective jaws 13 to cam the outer gripping portions of the jaws together.

The jaws 13, which may be formed of steel, are of generally channel form, and arranged with their bottoms in opposing relation to one another. The opposed bottom surfaces of the channels are relieved, as at 22, between their end portions to provide tool-engaging surfaces at the inner and outer extremities of the jaws, the gripping surfaces of the jaws being indicated at 23.

The sides of the channels at the forward portions thereof have inwardly sloping edges which provide tapered cam surfaces 24 for cooperation with the respective lugs 20 of the flange 18. The sloping cam surfaces 24 of one jaw are arranged in converging relation to the cam surfaces 24 of the other jaw, as shown in FIG. 3. The channel walls, which slope inwardly at their forward portions as previously indicated, slope outwardly at their rear portions, as at 25. Two pivot pins 26 are provided to pivotally mount the jaws 13 at their rear ends. The rear wall portions of the channels are of sufficient height to receive the pins 26 and the arrangement is such that the pins 26 extend through the rear wall portions of the respective channels.

The pivot pins 26 connect the jaws 13 to an operating member in the body 10 through links 27, the operating member being indicated generally at 28. The arrangement is such that four links are provided for this purpose, two for each jaw. The links 27 of each pair extend to opposite sides of the corresponding jaw, as indicated in FIG. 5. The links are arranged laterally outwardly of the respective side walls of the channels, and each has one end through which the corresponding pivot pin 26 extends. As best shown in FIG. 3, the links 27 associated with one jaw 13 cross the links associated with the other jaw 13. Two pivot pins 29 are provided to pivot the respective pairs of links 27 to the operating member 28, one pair of links having their other ends pivoted to the operating member by one of the pins 29 and the other pair having their other ends pivoted to the operating member by the other pin 29. In order that the pivotal links 27 of one pair may swing by the links 27 of the other pair without binding, four spacers 27a are provided, one on each of the pivot pins 26 and 29, as indicated in FIGS. 4 and 5.

The operating member 28, which is closely received and slidable in the body 10 to effect opening and closing movement of the jaws 13, is preferably formed of nylon to reduce friction. The operating member, which forms a nonrotary nut, has a threaded axial bore 30 extending therethrough and, as shown in FIG. 4, the body 31 of the operating member is generally of triangular form, having only relatively small areas thereof in contact with the body 10. As shown in the last-mentioned view, the forward end of the operating member is provided with a cross head 32. The links 27 which pivotally mount the jaws 13 are arranged at opposite sides of the cross head 32, and it is through the cross head 32 that the aforementioned pivot pins 29 extend. A yoke-shaped wire spring 33 is associated with the jaws, the spring having the major part thereof arranged at one side of the jaws and having the laterally bent distal end portions 34a of its arms extending through aligned holes provided in the walls of the respective jaws, as indicated in FIGS. 3 and 5. The arms of the yoke-shaped spring 33 are tensioned to urge the jaws apart.

The operating member 28, which as previously indicated constitutes a nonrotary nut, is connected to an actuating member, indicated generally at 34, having a tapered knob portion 35 adjacent and outwardly of the rear cap 11 and preferably being formed of nylon. The actuating member 34 in the instant form has as an integral part thereof a screw portion 36 extending through the aperture 12 in the end cap 11, the screw portion also, of course, being formed of nylon. The portion 36 is threaded into the bore 30 of the operating nut 28. To shift the operating member 28 forwardly in the body 10 together with the jaws while maintaining the knob portion 35 of the actuating member against the rear cap 11, a compression spring 37 is interposed between the last-mentioned cap and the rear of the member 28 in embracing relation to the screw portion 36. Manipulation of the actuating member 34 to unthread the screw portion 36 from the operating member 28 effects forward sliding movement of the member 28 and the jaws through the action of the spring 37. Manipulation of the actuating member 34 to rotate the latter in the opposite direction effects movement of the jaw-carrying operating member in the opposite direction, against the pressure of the spring 37, when the jaws are not engaged front and rear with a tool. It will be understood from the foregoing that in the illustrated form the nut or operating member 28 is held against rotation by engagement of the walls of the jaws with the means defining the cruciform opening in the forward end of the tool holder, as shown in FIG. 2.

The assembly of the tool holder will be manifest from the foregoing description of its construction. The jaws, when in unconnected condition, are first inserted through the front cap 14. The jaws are then pivotally connected to the operating member 28 through the links 27, and the yoke-shaped spring 33 is assembled with the jaws. This subassembly, together with the compression spring 37, may then be loaded into the front end of the tubular body 10. The front cap may then be threaded on the body and, after this, the jaws together with the operating member 28 may thrust rearwardly against the pressure of the spring by a force applied to the jaws externally of the holder to enable the actuating member 34 to be threaded into the rear end of the operating member 28. It will be understood from the foregoing that the front cap 14 forms in effect an integral part of the body of the holder.

To secure a hack saw blade, for example, in the holder, the blade is first inserted through the opening in the front end of the holder when the jaws are in their inoperative positions shown in FIG. 3. The cruciform opening in the front end of the holder readily admits a hack saw blade between the jaws. The knob portion of the actuating member is then rotated in a direction to retract the jaws in the tool holder. During this movement the jaws are drawn toward one another by the sloping cam surfaces 24 thereof acting against the corresponding lugs 20 which define parts of the cruciform opening in the holder. When the forward gripping portions 23 of the jaws firmly engage the hack saw blade, and the jaws, due to this movement, firmly wedge against the lugs 20, further inward movement of the jaws in the body of the holder is prevented. This condition is shown in FIG. 6. However, as shown in FIG. 6, the jaws have not fully closed, that is, their rear gripping portions 23 have not been brought toward one another far enough to engage and secure the saw blade. When the jaws are in their position shown in FIG. 6 and rearward movement of the operating member 28 is continued through manipulation of the actuating member 34, the crossed links 27, due to the pivot points 29 fixed with reference to the operating member 28, pull the rear portions of the jaws toward one another until the rear gripping portions 23 are firmly engaged with the hack saw blade.

The hack saw blade is then fully secured in the tool holder and it may be noted here that the rather widely spaced gripping portions of the jaws tend to increase the holding power of the jaws on a tool which may have some irregularities in the surfaces thereof, such as a hack saw blade. It may also be noted here that when a file is inserted in the tool holder for support thereby, the tang of the file may extend into the bore 30 in the operating nut so that a relatively long part of the file may be received in the holder if desired. A tool may be quickly released from the holder by actuation of the knob portion 35 in a direction to effect forward movement of the nut or operating member 28. When the operating member 28 is advanced in the holder, the rear portions of the jaws separate first through the action of the links 27. When the rear portions of the jaws have separated to the full extent permitted by the links 27, the links 27 thrust the jaws forwardly and the forward ends of the jaws then separate under the influence of the yoke-shaped spring 33 as the jaws are released from their wedging engagement with the opening in the forward end of the holder. Thus, it will be noted that the gripping action of the forward ends of the jaws is independent of the gripping action of the rear ends of the jaws and that the gripping action at the rear ends of the jaws, where most of the gripping action is necessary, is achieved positively through the links 27. Another advantage of the tool holder resides in the provision of a spring-pressed operating member which not only urges the jaws outwardly upon unthreading movement of the actuating member, but also maintains the knob of the actuating member in position relatively to the body during this unthreading movement.

A further advantage of the tool holder resides in the channeled construction of the jaws. The channel form of the jaws provides a jaw construction which is rugged and strongly resists bending forces. Furthermore, the sides of each channel provide two integrally formed cam surfaces of relatively extensive area for engagement with the corresponding portions of the cruciform opening in the forward end of the holder. It may be noted here that in the illustrated form the cam surfaces of each jaw cooperate with a generally rounded surface forming a part of the means defining the opening in the front end of the holder.

While only one form of the tool holder has been illustrated in the drawing and described above, it will be apparent to those versed in the art that the tool holder is susceptible of various changes in details without departing from the principles of the invention and the scope of the appended claims.

What I claim is:

1. In a tool holder, a tubular body providing a handle and having a forward end provided with means defining an opening for jaws extensible from and retractable in said body, a pair of elongated tool-gripping jaws extending through said means for longitudinal movement, said jaws having means coacting with the first-mentioned means for camming outer tool-gripping portions of the jaws toward one another upon retraction of the jaws in the body, an operating member movable lengthwise in the body to effect lengthwise movement of the jaws, an actuating member on the rear end of the body operable to move the operating member in either a forward or rearward direction, and positive means of connection between the operating member and the jaws for drawing inner tool-gripping portions of the jaws toward one another and, the last-named means comprising crossed pivotal links each having a pivotal axis fixed on the corresponding jaw and a pivotal axis fixed on the operating member.

2. In a tool holder, a tubular body providing a handle and having a forward end provided with means defining an opening for jaws extensible from and retractable in said body, a pair of elongated tool-gripping jaws extending through said means for longitudinal movement, said jaws having means coacting with the first-mentioned means for camming outer tool-gripping portions of the jaws toward one another upon retraction of the jaws in the body, an operating member movable lengthwise in the body to effect longitudinal movement of the jaws and spring urged forwardly, the spring-urged operating member reacting against the body, a rotatable actuating member on the rear end of the body having a threaded connection to the operating member to effect movement of the latter in either a forward or rearward direction upon rotation of the actuating member in the corresponding direction, and positive means of connection between the operating member and the jaws for drawing inner tool-gripping portions of the jaws toward one another, the last-named means comprising crossed pivotal links each having a pivotal axis fixed on the corresponding jaw and a pivotal axis fixed on the operating member.

3. In a tool holder, a tubular body providing a handle and having a forward end provided with means defining an opening for jaws extensible from and retractable in said body, a pair of elongated tool-gripping jaws extending through said means for longitudinal movement, said jaws having means coacting with the first-mentioned means for camming outer tool-gripping portions of the jaws toward one another upon retraction of the jaws in the body, a spring of yoke form having the arms thereof biasing the jaws apart, an operating member movable lengthwise in the body to effect lengthwise movement of the jaws and spring urged forwardly, said spring-urged operating member reacting against the body, a rotatable actuating member on the rear end of the body having a threaded connection to the operating member to effect movement of the latter in either a forward or rearward direction upon rotation of the actuating member in the corresponding direction, and positive means of connection between the operating member and the jaws for drawing inner tool-gripping portions of the jaws toward one another, the last-named means comprising crossed pivotal links each having a pivotal axis fixed on the corresponding jaw and a pivotal axis fixed on the operating member.

4. In a tool holder, a tubular body providing a handle and having a forward end provided with means defining an opening for jaws extensible from and retractable in said body, a pair of elongated tool-gripping jaws of channel form extending through said means for longitudinal movement, the bottoms of the channels being in opposing relationship, the outer edges of the channels having sloping portions forming cam surfaces coacting with the first-named means for camming outer tool-gripping portions of the jaws toward one another upon retraction of the jaws in the body, an operating member movable lengthwise in the body to effect lengthwise movement of the jaws and spring urged forwardly, said spring-urged operating member reacting against the body, a spring of yoke form having the arms thereof biasing the jaws apart, a rotatable actuating member on the rear end of the body having a threaded connection to the operating member to effect movement of the latter in either a forward or rearward direction upon rotation of the actuating member in the corresponding direction, and positive means of connection between the operating member and the jaws for drawing inner tool-gripping portions of the jaws toward one another, the last-named means comprising crossed pivotal links each having a pivotal axis fixed on the corresponding jaw and a pivotal axis fixed on the operating member.

5. A tool holder as defined in claim 4, wherein the means defining an opening in the forward end of the body provides a cruciform opening through which the jaws extend, the sides of the channel-shaped jaws coacting with opposing edge portions of the last-mentioned means to inhibit angular dislocation of the jaws.

References Cited in the file of this patent

UNITED STATES PATENTS

| | | |
|---|---|---|
| 1,124,498 | Miller | Jan. 12, 1915 |
| 1,242,097 | Anderson | Oct. 2, 1917 |
| 2,479,661 | Yoke | Aug. 23, 1949 |
| 2,669,896 | Clough | Feb. 23, 1954 |
| 2,745,305 | Reiffin | May 15, 1956 |